US009288229B2

(12) United States Patent
Kaufman (10) Patent No.: US 9,288,229 B2
(45) Date of Patent: Mar. 15, 2016

(54) DEVICE ASSOCIATION VIA VIDEO HANDSHAKE (75) Inventor: Matthew Kaufman, Bonny Doon, CA (US)

(73) Assignee: Skype, Dublin (IE)

( * ) Notice: Subject to any disclaimer, the term of this patent is extended or adjusted under 35 U.S.C. 154(b) by 0 days.

(21) Appl. No.: 13/293,242

(22) Filed: Nov. 10, 2011

(65) Prior Publication Data

US 2013/0125224 A1    May 16, 2013

(51) Int. Cl.
  H04L 9/00      (2006.01)
  H04L 29/06     (2006.01)
  H04W 12/06     (2009.01)
  H04W 4/20      (2009.01)
  H04L 29/08     (2006.01)

(52) U.S. Cl.
  CPC ............ *H04L 63/18* (2013.01); *H04L 67/14* (2013.01); *H04W 4/206* (2013.01); *H04W 12/06* (2013.01)

(58) Field of Classification Search
  CPC ....... H04L 63/18; H04L 67/14; H04W 4/206; H04W 12/06
  See application file for complete search history.

(56) References Cited

U.S. PATENT DOCUMENTS

| 7,254,708 | B2 | 8/2007 | Silvester |
| 7,729,489 | B2* | 6/2010 | Lee et al. ................ 379/212.01 |
| 8,224,354 | B2 | 7/2012 | De Vries et al. |
| 2003/0095521 | A1 | 5/2003 | Haller et al. |
| 2004/0253923 | A1 | 12/2004 | Braley et al. |
| 2005/0159132 | A1 | 7/2005 | Wright et al. |
| 2006/0046719 | A1 | 3/2006 | Holtschneider |
| 2006/0143455 | A1 | 6/2006 | Gitzinger |
| 2006/0282649 | A1 | 12/2006 | Malamud et al. |
| 2007/0094490 | A1* | 4/2007 | Lohr ............................ 713/153 |
| 2007/0173212 | A1 | 7/2007 | Mergler |
| 2008/0049704 | A1 | 2/2008 | Witteman et al. |
| 2008/0244721 | A1* | 10/2008 | Barrus et al. ...................... 726/9 |

(Continued)

FOREIGN PATENT DOCUMENTS

| CN | 1638383 | 7/2005 |
| CN | 101350723 | 1/2009 |

(Continued)

OTHER PUBLICATIONS

"International Search Report", Mail Date: May 7, 2013, Application No. PCT/US2012/064576, Filed date: Nov. 10, 2012, pp. 10.

(Continued)

*Primary Examiner* — Nirav B Patel
*Assistant Examiner* — Mohammed Waliullah
(74) *Attorney, Agent, or Firm* — Danielle Johnston-Holmes; Micky Minhas (57) ABSTRACT A method of pairing a first device with a second device is disclosed. Accordingly, an image that include encoded data is generated by the first device. The encoded data includes a unique identifier for identifying the first device and an arbitrary security code. The first device displays the image on a display. The second device captures the image using an image sensing device. The encoded data is decoded to generate a decoded data. The second device sends the decoded data to a server that is communicatively connected to the first device and the second device. Upon receiving the decoded data and using the unique identifier, the server communicates with the first device to verify the arbitrary security code.

21 Claims, 4 Drawing Sheets

(56) References Cited

U.S. PATENT DOCUMENTS

| | | | |
|---|---|---|---|
| 2009/0199279 A1* | 8/2009 | Lange et al. | 726/6 |
| 2009/0240814 A1 | 9/2009 | Brubacher et al. | |
| 2009/0247152 A1 | 10/2009 | Manne | |
| 2009/0287922 A1 | 11/2009 | Herwono et al. | |
| 2010/0115591 A1 | 5/2010 | Kane-Esrig | |
| 2010/0197322 A1* | 8/2010 | Preston et al. | 455/456.1 |
| 2010/0227549 A1 | 9/2010 | Kozlay | |
| 2010/0262696 A1 | 10/2010 | Oshiba | |
| 2010/0278345 A1 | 11/2010 | Alsina et al. | |
| 2011/0047607 A1 | 2/2011 | Chen et al. | |
| 2011/0072263 A1 | 3/2011 | Bishop et al. | |
| 2011/0086593 A1 | 4/2011 | Hardacker | |
| 2011/0092155 A1 | 4/2011 | Piemonte et al. | |
| 2011/0093266 A1 | 4/2011 | Tham | |
| 2011/0096174 A1* | 4/2011 | King et al. | 348/207.1 |
| 2011/0179182 A1 | 7/2011 | Vadla Ravnas | |
| 2011/0183614 A1 | 7/2011 | Tamura | |
| 2011/0208659 A1 | 8/2011 | Easterly et al. | |
| 2011/0219105 A1 | 9/2011 | Kryze et al. | |
| 2011/0281523 A1 | 11/2011 | Oshiba | |
| 2011/0295502 A1 | 12/2011 | Faenger | |
| 2011/0296506 A1 | 12/2011 | Caspi | |
| 2012/0011575 A1 | 1/2012 | Cheswick et al. | |
| 2012/0017081 A1 | 1/2012 | Courtney et al. | |
| 2012/0044057 A1 | 2/2012 | Kang et al. | |
| 2012/0045994 A1 | 2/2012 | Koh et al. | |
| 2012/0054046 A1 | 3/2012 | Albisu | |
| 2012/0131186 A1 | 5/2012 | Klos et al. | |
| 2012/0140925 A1* | 6/2012 | Bekiares et al. | 380/255 |
| 2012/0158581 A1* | 6/2012 | Cooley et al. | 705/40 |
| 2012/0158898 A1 | 6/2012 | van Deventer et al. | |
| 2012/0184372 A1 | 7/2012 | Laarakkers et al. | |
| 2012/0188147 A1 | 7/2012 | Hosein et al. | |
| 2012/0189140 A1 | 7/2012 | Hughes | |
| 2012/0198531 A1 | 8/2012 | Ort et al. | |
| 2012/0214416 A1 | 8/2012 | Kent et al. | |
| 2012/0278727 A1* | 11/2012 | Ananthakrishnan et al. | 715/748 |
| 2012/0324076 A1 | 12/2012 | Zerr et al. | |
| 2013/0031275 A1 | 1/2013 | Hanes | |
| 2013/0036461 A1 | 2/2013 | Lowry | |
| 2013/0088649 A1 | 4/2013 | Yum | |
| 2013/0110723 A1 | 5/2013 | Huang et al. | |
| 2013/0122810 A1 | 5/2013 | Kaufman | |
| 2013/0124292 A1* | 5/2013 | Juthani | 705/14.26 |
| 2013/0265857 A1 | 10/2013 | Foulds | |
| 2013/0276079 A1 | 10/2013 | Foulds et al. | |
| 2014/0256260 A1 | 9/2014 | Ueda | |
| 2014/0305828 A1 | 10/2014 | Salvo | |

FOREIGN PATENT DOCUMENTS

| | | |
|---|---|---|
| CN | 101872448 | 10/2010 |
| EP | 1551140 A1 | 7/2005 |
| JP | 2005122651 | 5/2005 |
| WO | WO-0158080 | 8/2001 |
| WO | WO-2011010925 | 1/2011 |

OTHER PUBLICATIONS

"International Search Report and Written Opinion", Application No. PCT/US2012/064577, (Feb. 21, 2013), 22 pages.

Goodrich, et al., "Loud and Clear—Human-Verifiable Authentication Based on Audio", *Proceedings of the 26th IEEE International Conference on Distributed Computing Systems*, Available at https://www.cs.duke.edu/~msirivia/publications/icdcs.pdf>,(Jul. 4, 2006),15 pages.

Prasad, et al., "Efficient Device Pairing using Human-Comparable Synchronized Audiovisual Patterns", *Proceedings of the 6th International Conference on Applied Cryptography and Network Security*, Available at <http://www.cis.uab.edu/saxena/docs/sr07.pdf>,(Jun. 3, 2008),19 pages.

Saxena, Nitesh et al., "Secure Device Pairing Based On a Visual Channel", *IEEE Symposium on Security and Privacy*, 2006, Available at <http://eprint.iacr.org/2006/050.pdf>,(May 2006), pp. 1-17.

Soriente, et al., "HAPADEP—Human-Assisted Pure Audio Device Pairing", *Proceedings of the 11th International Conference on Information Security*, Available at <http://sprout.ics.uci.edu/papers/hapadep.pdf>,(Sep. 15, 2008), 11 pages.

"Non-Final Office Action", U.S. Appl. No. 13/293,245, Nov. 26, 2013, 13 pages.

"Non-Final Office Action", U.S. Appl. No. 13/828,343, Mar. 27, 2014, 13 pages.

"Final Office Action", U.S. Appl. No. 13/293,245, Mar. 25, 2014, 14 pages.

"Non-Final Office Action", U.S. Appl. No. 13/293,245, Jul. 3, 2014, 17 pages.

"Final Office Action", U.S. Appl. No. 13/828,717, May 20, 2015, 20 pages.

"Non-Final Office Action", U.S. Appl. No. 13/293,245, Apr. 17, 2015, 18 pages.

"Foreign Office Action", CN Application No. 201210585999.1, Jul. 27, 2015, 16 pages.

"Final Office Action", U.S. Appl. No. 13/293,245, Nov. 5, 2014, 17 pages.

"Final Office Action", U.S. Appl. No. 13/828,343, Nov. 14, 2014, 14 pages.

"Foreign Office Action", CN Application No. 201210597199.1, Jan. 29, 2015, 14 pages.

"Non-Final Office Action", U.S. Appl. No. 13/828,717, Nov. 28, 2014, 20 pages.

"Final Office Action", U.S. Appl. No. 13/293,245, Dec. 9, 2015, 17 pages.

"Foreign Office Action", CN Application No. 201210597199.1, Oct. 19, 2015, 13 Pages.

"Non-Final Office Action", U.S. Appl. No. 13/828,343, Dec. 7, 2015, 14 pages.

"Non-Final Office Action", U.S. Appl. No. 13/828,717, Dec. 17, 2015, 25 pages.

* cited by examiner

DEVICE ASSOCIATION VIA VIDEO HANDSHAKE

BACKGROUND OF THE INVENTION

This application is related to UK Patent Application No. 1119407.3 entitled "Establishing a Communication Event," filed concurrently on the same day.

FIELD OF THE INVENTION

Embodiments of the present invention relate generally to establishing and management a communication event between first and second user terminals.

DESCRIPTION OF THE RELATED ART

Traditionally, electronic devices are paired using Bluetooth™ technology. The term "pairing" means that two devices exchange some data to agree to work together to provide a predefined function. For example, a Bluetooth™ enabled mobile phone may be paired with a Bluetooth™ headset and upon a successful pairing, the headset provides speakers and microphone to the mobile phone.

There are many issues with the above stated method of pairing devices. First, a special hardware is needed at both ends to effectuate such pairing. Second, such pairing can only be used for predetermined specific functions. Also, the Bluetooth™ signals have wider range, hence, without a proper security, unintended pairing may occur. Still further, the paired devices must stay within a particular range after the pairing.

SUMMARY OF THE INVENTION

In one embodiment, a method of pairing a first device with a second device is disclosed. An image that includes a unique identifier for identifying a first device and a security code is generated and displayed on the first device. A second device captures the image using an image sensing device. The unique identifier and the security code is then sent to a server that is communicatively connected to the first device and the second device. The server communicates with the first device, using the unique identifier, to verify the security code.

In another embodiment, a method of pairing a first device with a second device is disclosed. Accordingly, an image that include encoded data is generated by the first device. The encoded data includes a unique identifier for identifying the first device and an arbitrary security code. The first device displays the image on a display. The second device captures the image using an image sensing device. The encoded data is decoded to generate a decoded data. The second device sends the decoded data to a server that is communicatively connected to the first device and the second device. Upon receiving the decoded data and using the unique identifier, the server communicates with the first device to verify the arbitrary security code.

In yet another embodiment, a system for pairing a first device with a second device is disclosed. The system includes a first device connected to a network. The first device is configured to generate an image that include encoded data. The encoded data includes a unique identifier for identifying the first device and an arbitrary security code, and to display the image on a display of the first device. The system also includes a second device connected to the network. The second device is configured to capture the image and to decode the encoded data to generate a decoded data, and to send the decoded data to a server that is communicatively connected to the first device and the second device. The server is connected to the first device and the second device through the network and the server is configured to communicate, using the unique identifier, with the first device to verify the arbitrary security code.

In yet another embodiment, a computer readable storage medium containing a program which, when executed, performs an operation of pairing a first device with a second device, is disclosed. The operation comprises capturing an image using an image sensor. The image includes a unique identifier of another device and a security code. The operation further includes sending the unique identifier and the security code to a server via a network and instructing the server to communicate with the another device using the unique identifier to verify the security code with the another device.

Other embodiments include, without limitation, a non-transitory computer-readable storage medium that includes instructions that enable a processing unit to implement one or more aspects of the disclosed methods as well as a system configured to implement one or more aspects of the disclosed methods.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

Reference throughout this disclosure to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Some communication systems allow the user of a device, such as a personal computer, to communicate across a packet-based computer network such as the Internet. Such communication systems include voice over internet protocol ("VoIP") communication systems. These systems are beneficial to the user as they are often of significantly lower cost than conventional fixed line or mobile networks. This may particularly be the case for long-distance communication. To use a VoIP system, the user installs and executes client software on her/his device. The client software provides the VoIP connections as well as other functions such as registration and authentication. In addition to voice communication, the client may also provide further features such as video calling, instant messaging ("IM"), SMS messaging, file transfer and voicemail.

One type of communication system for packet-based communication uses a peer-to-peer ("P2P") topology. In one embodiment, to enable access to a peer-to-peer system, a user must execute client software provided by a communication system software provider (or a third party vendor) on their computer (which includes any supported computing device, including smart phones), and register with the P2P system. When the user registers with the P2P system, the client software is provided with a digital certificate from a server. Once the client software has been provided with the certificate, then calls or other communications can subsequently be set up and routed between users of the P2P system without the further use of a server in the set-up. Instead, the client looks up the required IP addresses from information distributed amongst the client software on other end users' computers within the P2P system. Once the IP address of a callee's terminal has thus been determined, the caller's client software then exchanges certificates with the callee's client software. The exchange of the digital certificates (or user identity certificates, "UIC") between users provides proof of the users' identities and that they are suitably authorized and authenticated in the P2P system. Therefore, the presentation of digital certificates provides trust in the identity of the users. It is therefore a characteristic of peer-to-peer communication that, once registered, the users can set up their own communication routes through the P2P system in a decentralized manner based on distributed address look-up and the exchange of one or more digital certificates, without using a server for those purposes. Further details on such a P2P system are disclosed in WO 2005/008524 and WO 2005/009019. VoIP or other packet-based communications can also be implemented using non-P2P systems that do use centralized call set-up.

Figure 1:
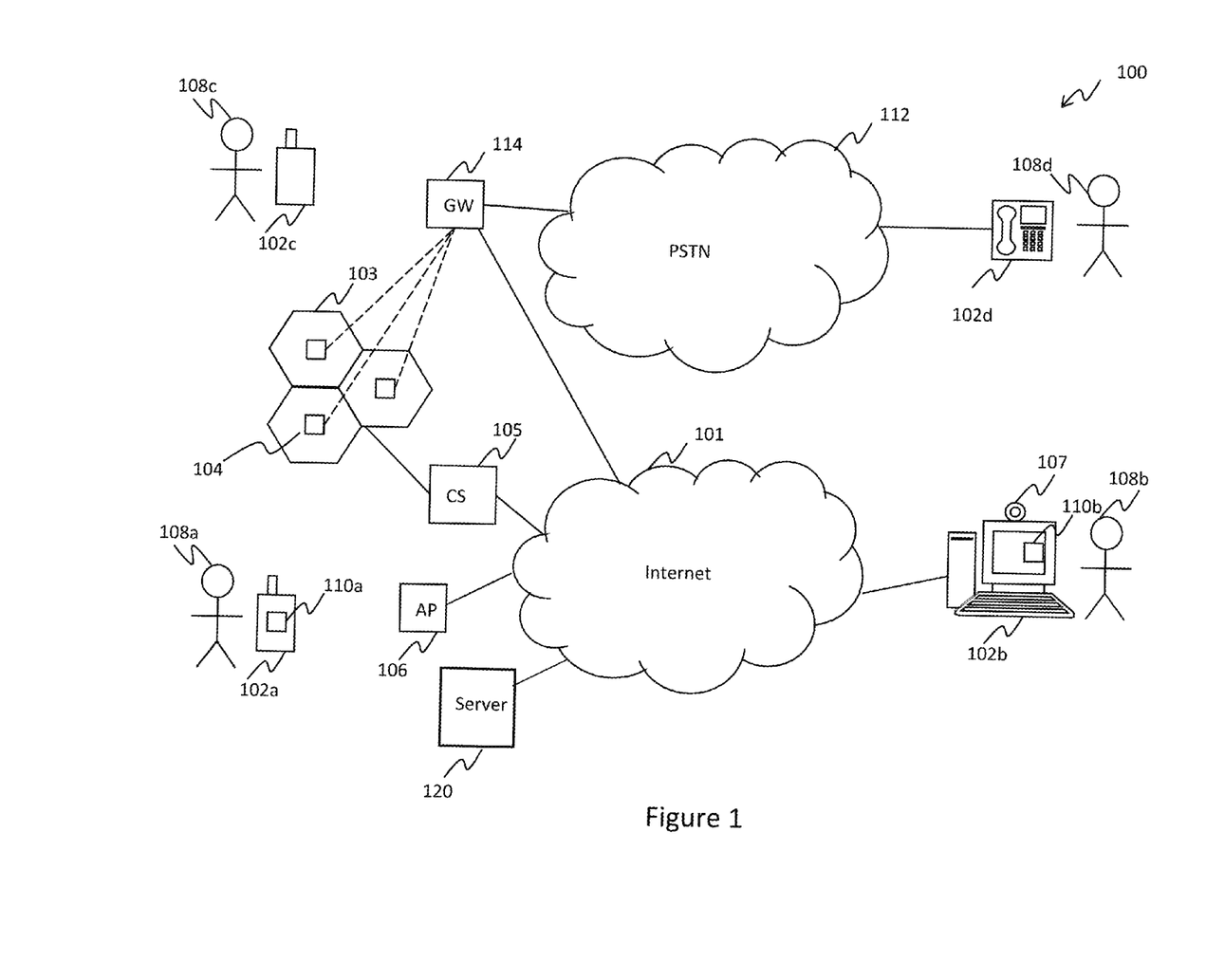
FIG. 1 illustrates a schematic depiction of a communication system based on the Internet, according to one embodiment of the present invention.

FIG. 1 is a schematic illustration of a communication system 100 comprising a packet-based network 101 such as the Internet, a mobile cellular network 103, and a circuit switched network 112 such as the public switched telephone network (PSTN). The mobile cellular network 103 comprises a plurality of base stations 104 (sometimes referred to as node Bs in 3GPP terminology). Each base station 104 is arranged to serve a corresponding cell of the cellular network 103. Each base station 104 is connected to the circuit switched network 112 via a gateway 114. Further, the packet-switched network 101 comprises a plurality of wireless access points 106 such as Wi-Fi access points for accessing the Internet. These may be the access points of one or more wireless local area networks (WLANs). In one embodiment, the gateway 114 is also coupled to the Internet 101 to enable the routing of a call between the PSTN 112 and the Internet 101.

A plurality of user terminals 102 are arranged to communicate over one or more of the networks 101, 103, 112. For merely illustration purposes only, FIG. 1 shows user terminal 102a as an Internet-enabled mobile device, user terminal 102b as a desktop or laptop PC, user terminal 102c as a cellular mobile phone 102c, and user terminal 102d as a landline telephone connected to the circuit switched network 112.

Figure 2:
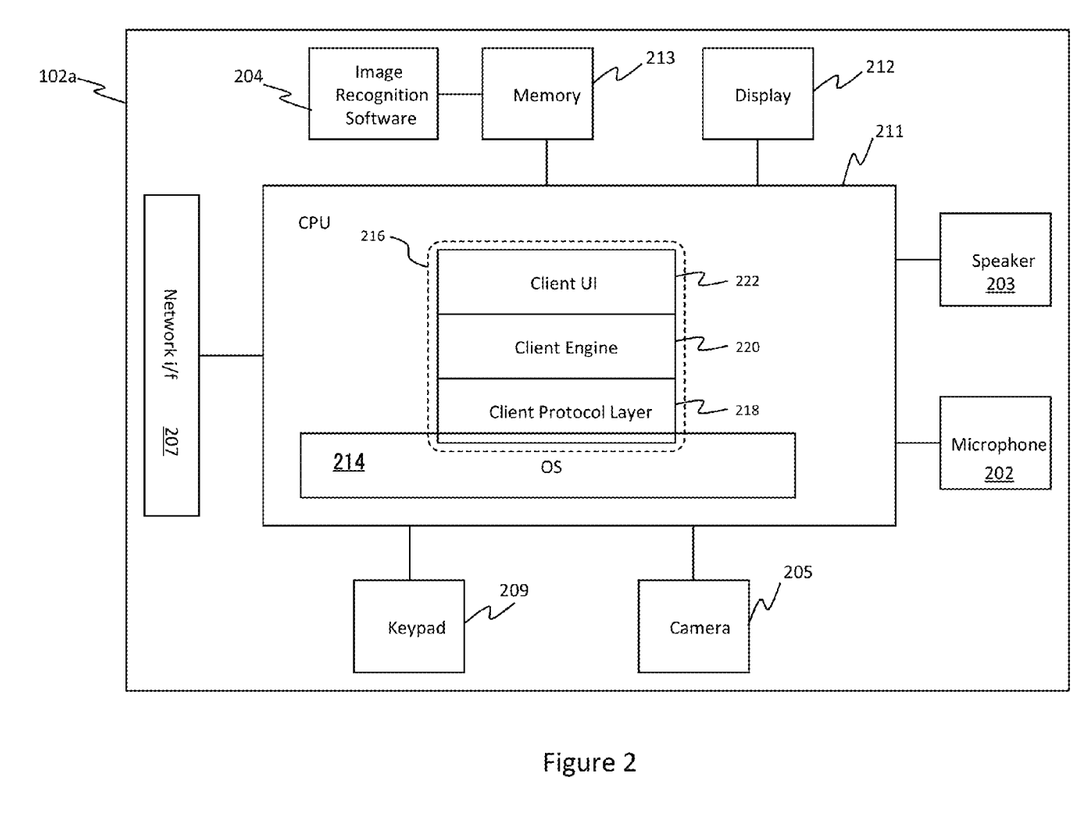
FIG. 2 is a logical diagram of an end user terminal, according to one embodiment of the present invention.

An example mobile device 102a is shown schematically in FIG. 2. The mobile device 102a comprises a processing apparatus in the form of one or more processor units (CPUs) 211 coupled to a memory 213 storing a communication client application. The processor 211 is also coupled to: a microphone 202, a speaker 203, camera 205, a one or more RF transceivers 207, a keypad 209, and a display 212.

The one or more transceivers 207 enable the mobile device 102a to access the one or more networks 101, 103, 112. For example, mobile device 102a may comprise a cellular wireless transceiver for accessing the mobile cellular network 103 via the base stations 104, and/or a wired or wireless modem for accessing the Internet 101. In the case of a wireless modem, this typically comprises a short-range wireless transceiver (e.g. Wi-Fi) for accessing the Internet 101 via the wireless access points 106.

Access to the Internet 101 may also be achieved by other means such as GPRS (General Packet Radio Service) or HSPA (High Speed Packet Access). At a higher level of the cellular hierarchy, the cellular network 103 comprises a plurality of cellular controller stations 105 each coupled to a plurality of the base stations 104. The controller stations 105 are coupled to a traditional circuit-switched portion of the mobile cellular network 103 but also to the Internet 101. The controller stations 105 are thus arranged to allow access to packet-based communications via the base stations 104, including access to the Internet 101. The controller stations 105 may be referred to for example as Base Station Controllers (BSCs) in GSM/EDGE terminology or Radio Network Controllers (RNCs) in USTM or HSPA terminology.

The memory 213 may comprise a non-volatile memory such as an electronic erasable and programmable memory (EEPROM, or "flash" memory) coupled to the processor 211. The memory stores communications code arranged to be executed on the processor, and configured so as when executed to engage in communications over one or more networks 101, 103, 112. The communications code preferably comprises a communication client application 110a provided by a software provider associated with the communication system. The communication client application 110a may be executed for performing communications such as voice or video calls with other user terminals 102 over the Internet 101, via a short-range wireless transceiver 207 and wireless access points 106, and/or via a cellular wireless transceiver 207, base stations 104 and controller stations 105 of the cellular network 103 as discussed above. However, one or more of the user terminals 102 involved could alternatively communicate via a wired modem, e.g. in the case of a call between a mobile terminal and a desktop PC.

As shown in FIG. 1 both user terminals 102a and 102d execute a communication client software 110 in order for the user terminals 102a and 102d to transmit and receive data over the Internet 101.

The communication system 100 also includes a server 120. In one embodiment, the server 120 is a Peer-to-Peer (P2P) communication server. Further, in one embodiment, the server 120 provides one or more of the following functions: call setup, call management, routing calls among the user terminals connected to the Internet 101 and routing calls among the user terminals connected to the Internet 101 and telephones connected to the PSTN network 112, etc. In one embodiment, the server 120 works cooperatively with the user stations with the help of a client software that runs on the user stations and/or the gateway 114.

FIG. 2 illustrates a schematic diagram of a user terminal 102a. The user terminal includes operating system ("OS") 214 executed on the CPU 202. Running on top of the OS 214 is a software stack 216 for the client 108. The software stack shows a client protocol layer 218, a client engine layer 220 and a client user interface layer ("UI") 222. Each layer is responsible for specific functions. Because each layer usually communicates with two other layers, they are regarded as being arranged in a stack as shown in FIG. 2. The operating system 214 manages the hardware resources of the computer and handles data being transmitted to and from the link 106 via the network interface 110. The client protocol layer 218 of the client software communicates with the operating system 214 and manages the connections over the communication system. Processes requiring higher level processing are passed to the client engine layer 220. The client engine 220 also communicates with the client user interface layer 222. The client engine 220 may be arranged to control the client user interface layer 222 to present information to the user 102 via the user interface of the client and to receive information from the user 102 via the user interface.

Image recognition software 204 may be stored in memory 213 or in a separate memory not shown in FIG. 2. Therefore when the camera 205 captures image data, the CPU 211 may execute the image recognition software 204 to decode any information encoded or obfuscated in the image data. In embodiments of the present invention described more fully below, the image recognition software 204 supplies decoded information from a barcode to the client engine 220. In one embodiment, the image recognition software 204 may be a part of the software stack 216. In other embodiments, the image recognition software 204 may be implemented in hardware. The image recognition software 204 may also be embedded in a driver for the camera 205.

Images and shapes may encapsulate data that can be encoded by a reader in conjunction with selected configurations. For example, a triangle shape may be configured to convey a particular meaning between two entities. Other types of shapes may be used for conveying different types of information. Further, barcodes are commonly known in the art to comprise encoded data such that they may be optically read, and the encoded information decoded in order to read information about an item that the barcode is attached to.

There are two types of barcodes, linear barcodes and two dimensional (2D) barcodes, sometimes referred to as 'matrix' barcodes. One type of 2D barcode is the Quick Response (QR) barcode.

Figure 3:
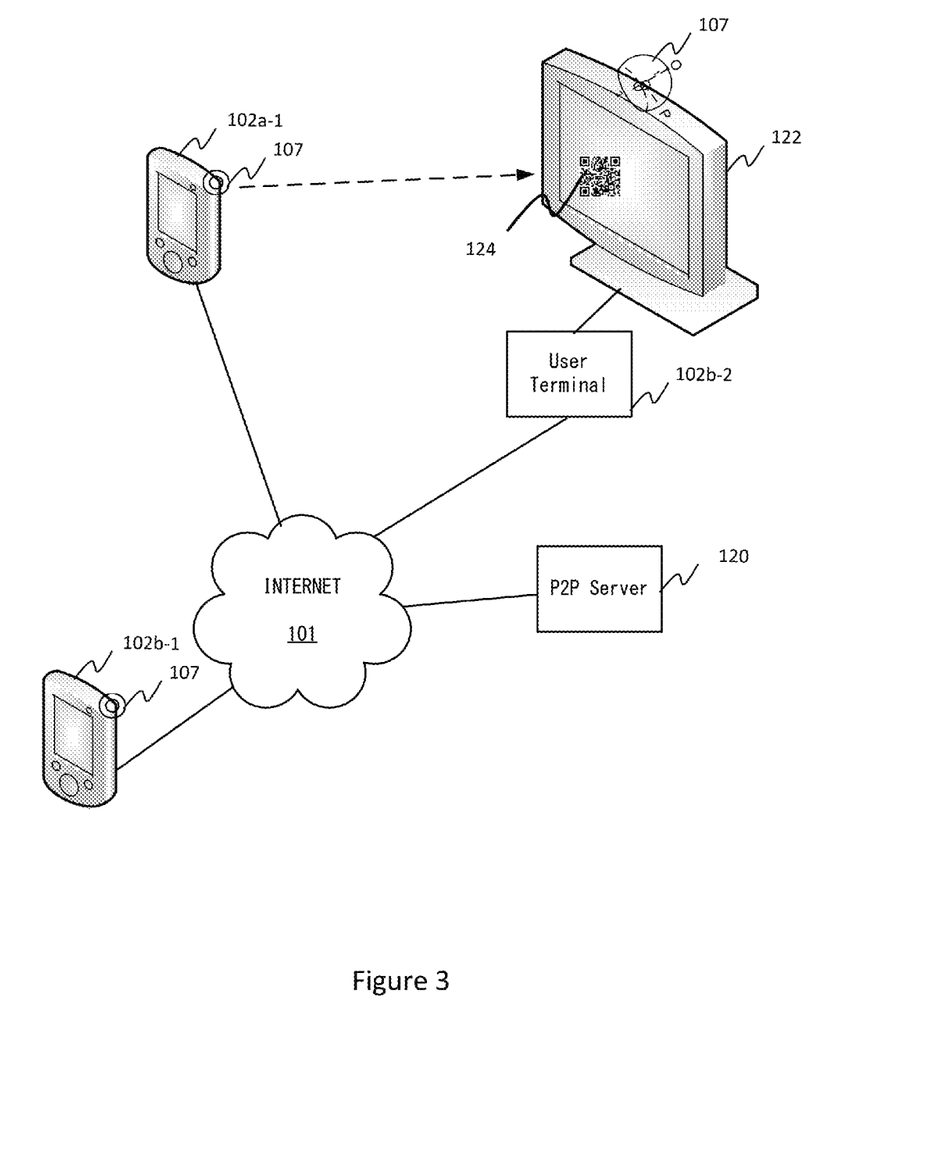
FIG. 3 illustrates an exemplary use case scenario of call management, according to one embodiment of the present invention.

FIG. 3 illustrates one example scenario of pairing two user terminals using a video handshake. In this example, a user terminal 102a is in a call session with a user terminal 102b-1. The call may be voice call, chat or audio/video call. One of the user terminals 102a and 102b-1 may be connected to the PSTN network 112 and the call between the user terminal 102a and the user terminal 102b-1 may be established through the gateway 114. In another embodiment, both user terminals may be connected to the Internet 101 and are also in a cooperative communication with the server 120 via client software. Imagine now that the user of the user terminal 102a (which could be a handheld device) walks into a conference room, which includes a LCD TV (or any other type of display) 122 and a camera 107. The LCD TV 122 is coupled to a user terminal 102b-2 connected to the Internet 101. In one embodiment, the LCD TV 122 may include client software in its own memory. If so, then the LCD TV 122, standalone, would function as a user terminal without a need for any external hardware, such as a computer.

Suppose the user of the user terminal 102a wants to pair the LCD TV 122 with the user terminal 102a in order to use the LCD TV 122 for Audio/Video. Alternatively, the user may want to transfer the communication session between the user terminal 102a and the user terminal 102b-1 from the user terminal 102a to the LCD TV 122 without interrupting the ongoing call session and transparently to the user of the user terminal 102b-1.

In one embodiment, the user of the user terminal 102a would invoke a user interface (e.g., the UI 222 in FIG. 2) in the user terminal 102a. The user interface would have various configurable options. For example, the user interface may have one or more of the following options: transfer session, transfer audio, transfer video, transfer chat, and various combinations thereof.

It should be noted that the examples in this disclosure are provided merely to impart a better understanding of the invention. A person skilled in the art would realize that the systems and methods disclosed herein are directed to pairing of devices. Once paired, the devices may participate in many other activities, such as data transfer, one device controlling the other, etc. Unlike traditional pairing of devices using other technologies, such as Bluetooth™, the two devices, once paired, communicate via a server. Therefore, there is no location restriction on the paired devices. However, in another embodiment, the pairing include both server supported pairing, as described herein, and a device-to-device pairing, so that devices may exchange information directly as well as via the server. Among other, one advantage of the pairing methods described herein is that no special "pairing specific" hardware is required to effectuate the pairing of the two devices. Therefore, existing devices without any pairing specific hardware (e.g., Bluetooth™ hardware) may be configured to be paired using the methods described herein.

The LCD TV 122 is connected to the Internet 122 and can be located by the server 120 using a distinct identification. In one example, suppose the user selects (via the user interface) to transfer the video stream of the communication session from the user terminal 102a to the LCD TV 122. Upon the selection of an option, the user interface activates the camera 107 and the image recognition software 204 of the user terminal 102a. A second user interface is invoked on the LCD TV 122 either via the client software in the LCD TV 122 (or in the user terminal 102b-2) or via a separate software, hardware, or combination thereof. The user interface on the LCD TV 122 displays a coded pattern 124. In another embodiment, a number is displays on the LCD TV 122 instead of a graphical pattern. The coded pattern may be a QR code or a barcode. The coded pattern, in one example, includes the IP address of the LCD TV 122 (or the user terminal 102b-2). Additionally, the coded pattern may also include another number or code. Alternatively, the coded pattern may include just one number. In another example, the LCD TV 122 may simply display one or more words.

If the coded pattern is configured to include the IP address and a security code, the camera 107 of the user terminal 102a, when brought close to the displayed coded pattern, deciphers the coded pattern and extracts the IP address and the security code. In an alternative embodiment, the user terminal 102a send the encoded pattern to either the server 120 or another external device that is connected to the Internet 101 for deciphering the encoded pattern. The client software of the user terminal 102a sends the IP address and the security code to the server 120 with the instructions that the video portion of the ongoing communication session be transferred to the LCD TV 122. Upon receiving said instructions, the server asks the LCD TV for the security code. In one embodiment, other data related to the devices and/or the user may also be sent to the server 120. However, in yet another embodiment, only the IP address and the security code are sent to the server 120. The handshake is complete when the security code provided to the server 120 by the user terminal 102*a* matches with the security code received directly from the LCD TV 122. In one embodiment, the security code included in the coded pattern may be transient and may be valid only for a selected period of time. In another embodiment, the security check may be optional and the coded pattern may include only the IP address.

In another embodiment, any other identification of the LCD TV 122 may be included instead of the IP address so long as the server 120 can locate the LCD TV 122 on the Internet 101 by that identification.

In another example, instead of a coded pattern, the LCD TV 122 may simply display the IP address and/or any other type of temporary or permanent identification code (such as the MAC number, machine network name, etc.) in plain text and the image recognition software 204 may be configured to recognize plain text characters.

In one example, the server 120 is configured to maintain separate data streams for audio, video and chat. Hence, if the user terminal 102*a* requests the server 120 to transfer the video to the LCD TV 122, the server 120 redirects the video stream to the LCD TV 122. In a partial transfer of the communication session, the part that is transferred to LCD TV 122 runs concurrently and synchronously with the remaining part of the communication session on the user terminal 102*a*. Similarly, if the complete session transfer was desired, the server 120 redirects all data streams to the IP address of the LCD TV 122.

In one embodiment, if the P2P communication system requires P2P users to log in using unique user identifications, the server 120 is configured to automatically send a login certificate (corresponding to the user of the user terminal 102*a*) to the LCD TV 122 (or the user terminal 102*b*-2) so that the user of the user terminal 102*a* is automatically logged into the LCD TV 122 (or the user terminal 102*b*-2).

It should be noted that the code pattern itself may also include the operation to be performed by the other user terminal after a successful pairing, thus diminishing a need for displaying multiple options on the user interface of the user terminal 102*a*. Instead, the user interface on the LCD TV 122 may generated different codes for different operations. Further, it should also be noted that in the above example, a session may be transferred from the LCD TV 122 to the user terminal 102*a* using the same method as described above. Similarly, a particular user station may be paired with a plurality of other user stations or devices, each performing either a distinct or duplicate function of a selected session, as for example, two devices may be setup to display the video part of the communication session. However, as stated above, the above examples are being provided for the easy understanding of the invention. The above embodiments may also be used for performing other operations that require a pairing of two or more devices.

Figure 4:
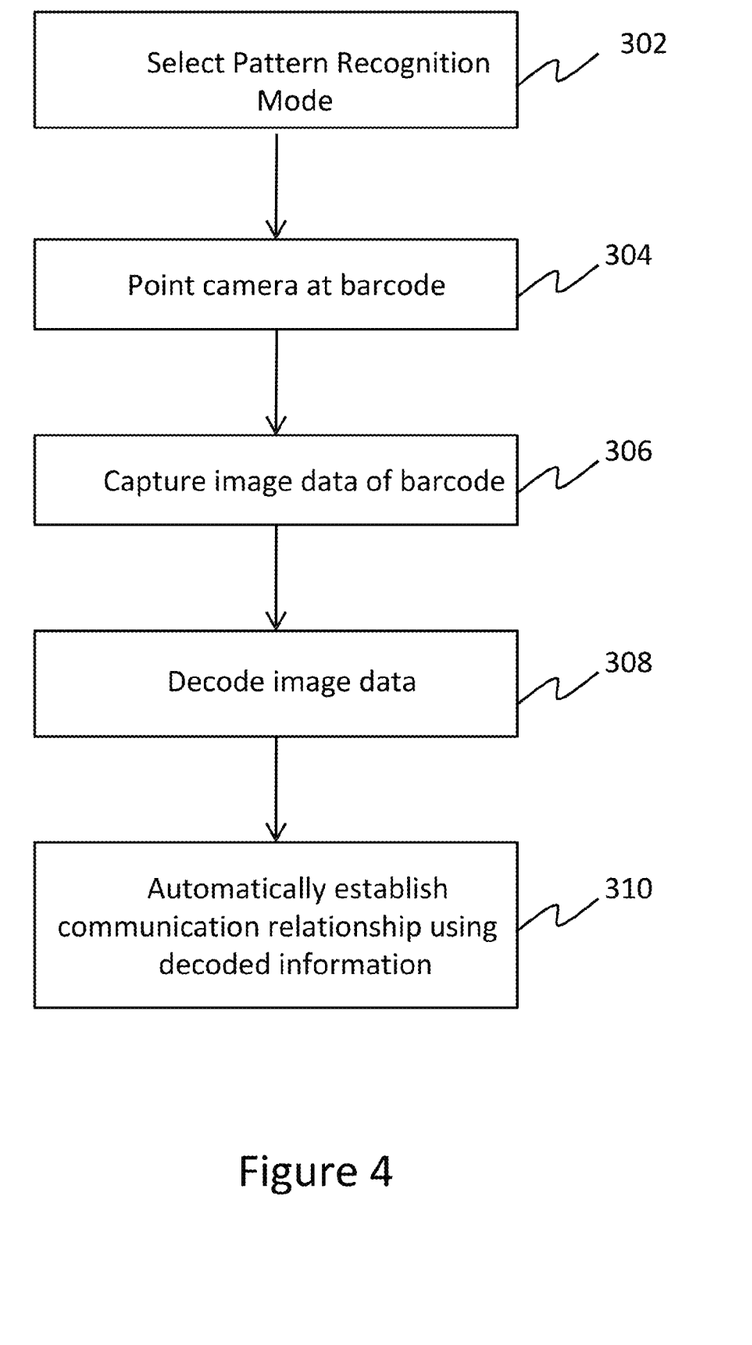
FIG. 4 illustrates a method of pairing two devices, according to one embodiment of the present invention.

The method of establishing a communication relationship between mobile device 102*a* and user device 102*b* will now be discussed with reference to FIG. 4. When the user 108*a* of the mobile device 102*a* decides to establish a communication relationship between the mobile device 102*a* and the user device 102*b*, a coded pattern is displayed on the display of the user device 102*b*. As described above, in one embodiment, the coded pattern may contain the IP address or any other unique identification of the user device 102*b*. Optionally, the coded pattern may also include a security code.

When the communication client 110*a* is executed on user device 102*a* the client 110*a* presents an option to the user 108*a* to enter a pattern recognition mode. At step 302, the user 108*a* may enter this recognition mode by making an appropriate input selection for example pressing a button on mobile device 102*a*, touching the appropriate section of display 212 or making a voice command or the like.

At step 304, the user 108*a* points the camera 205 of the mobile device 102*a* at the coded pattern. The user 108*a* then makes an appropriate selection on mobile device 102*a* to capture image data of the coded pattern at step 306. It will be appreciated that the captured image data comprises encoded information including IP address of the user terminal 102 (or any other identification to enable the server 120 to locate the user terminal 102*b* in the Internet 101) and also optionally a security code and/or encoded data defining a communication event related to the entity that generated the coded pattern.

As a result of the communication client 110*a* being in the pattern recognition mode, at step 308 the CPU 211 executes the image recognition software 204 to decode the image data and supplies decoded information to the communication client application 110*a*, the decoded information including decoded contact information and decoded data defining a communication event related to the entity that generated the barcode.

It will be appreciated that when the client 110*a* is not in the barcode recognition mode, and the user 108*a* uses camera 205 to capture image data the captured image data is stored in memory (whether internal or external) and no further action is taken.

At step 310, in response to receiving the decoded contact information, the communication client 110*a* establishes a communication relationship using the decoded information. That is the communication client establishes a communication relationship, for example transferring an ongoing communication session or a part thereof, from the mobile device 102*a* to the user device 102*b*. As described above, the server 120 takes part in the process of establishing the communication relationship between the mobile device 102*a* and the user device 102*b*.

While the forgoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention.

I claim:

1. A method comprising:
   participating in an active communication session between a first device and a second device, the active communication session including an audio-visual communication;
   capturing, using an image sensing device of the first device, an image displayed on a display of a third device, the image generated to expose a unique identifier identifying the third device, a security code, and an indication that the first device is to initiate transfer of at least part of the active communication session between the first device and the second device to the third device after the first device and the third device are paired; and
   sending a request that includes the unique identifier and the security code to a server to enable the server to verify, using the unique identifier, the security code to pair the first device and the third device for communication, the pairing of the first device and the third device causing a communication channel to be established between the first device and the third device and enabling the at least part of the active communication session to be transferred from the first device to the third device via the communication channel established through the pairing upon verification of the security code, according to a preference of the user of the first device, and without interrupting the active communication session, the active communication session transferred without interruption, at least in part, by running a remaining portion of the active communication session concurrently and synchronously on the first device with the at least part of the active communication session that is transferred.

2. The method of claim 1, wherein the unique identifier and the security code are included in the image in an obfuscated form and the unique identifier and the security code are configured to be decoded from the image by one or more of the first device or the server.

3. The method of claim 2, wherein the first device is in the active communication session with the second device at a time of said sending.

4. The method of claim 1, wherein the remaining portion of the active communication session runs concurrently and synchronously on the first device with the at least part of the active communication session that is transferred responsive to less than a whole of the active communication session being transferred from the first device.

5. The method of claim 1, wherein an authentication certificate that corresponds to a user of the first device is generated and sent to the third device prior to the transfer.

6. The method of claim 1, wherein the transfer of the at least part of the active communication session causes a session between the second device and the third device to be set up.

7. The method of claim 1, wherein the at least part of the active communication session that is transferred from the first device to the third device includes a video portion of the active communication session responsive to less than an entire active communication session being transferred from the first device.

8. A system comprising:
   one or more processors; and
   one or more computer-readable storage media storing instructions that are executable by the one or more processors to perform operations including:
   participating in an active communication session between a first device and a second device, the active communication session including an audio-visual communication;
   during the active communication session between the first device and the second device, capturing an image displayed on a display of a third device, the image being generated to expose a unique identifier for identifying the third device, a security code, and an indication that the first device is to initiate a transfer of at least part of the active communication session between the first device and the second device to the third device after the first device and the third device are paired;
   processing the image to retrieve the unique identifier and the security code; and
   sending the unique identifier and the security code to a server to enable the server to verify the security code using the unique identifier, and to pair the first device with the third device, the pairing effective to initiate a communication event between the first device and the third device that enables the first device to initiate the transfer of the at least part of the active communication session from the first device to the third device over a communication channel established as part of the pairing and to maintain the active communication session with the second device throughout the transfer, the communication channel established upon verification of the security code and according to a preference of a user of the first device.

9. The system of claim 8, wherein the unique identifier and the security code are obfuscated in the image and are configured to be decoded from the obfuscated form by at least one of the first device or the server.

10. The system of claim 8, wherein the first device is configured to participate in the active communication session with the second device at a time of said sending.

11. The system of claim 8, wherein the first device is configured to run a remaining communication session with the second device concurrently and synchronously with the at least part of the active communication session that is transferred responsive to less than a whole of the active communication session being transferred from the first device.

12. The system of claim 8, wherein a user of the first device is associated with an authentication certificate generated by the server and sent to the third device, prior to the transfer.

13. The system of claim 8, wherein the transfer of the at least part of the active communication session is configured to cause a session to be established between the second device and the third device.

14. The system of claim 8, wherein the at least part of the active communication session that is transferred includes a video portion of the active communication session responsive to less than an entire active communication session being transferred from the first device.

15. A computer readable storage device comprising a program which, responsive to execution by one or more computing devices, causes the one or more computing device to perform operations comprising:
   capturing an image using an image sensor of a first device, the image including a unique identifier of a second device, a security code, and an indication that the second device is to initiate a transfer of at least part of an active communication session between the second device and a third device from the second device to the first device after the first device and the second device are paired, the unique identifier identifying the second device on a network for communication, the security code comprising a piece of information that is separate from the unique identifier and verifiable by the second device, and the active communication session including an audio-visual communication;

sending the unique identifier and the security code to a server via the network and instructing the server to communicate with the second device using the unique identifier to verify the security code with the second device; and responsive to verification of the security code, pairing the first device and the second device for communication, the pairing causing a communication channel to be established between the first device and the second device that allows the second device to initiate the transfer specified by the indication and according to a preference of a user of the second device, the active communication session with the third device being maintained throughout the transfer.

16. The computer readable storage device of claim 15, wherein the operations further include decoding the unique identifier and the security code from the image if the image includes the unique identifier and the security code in an obfuscated form.

17. The computer readable storage device of claim 15, wherein the operations further include determining that at a time of the sending, the second device is in the active communication session with the third device.

18. The computer readable storage device of claim 15, wherein the unique identifier and the security code are included in the image in an obfuscated form and the unique identifier and the security code are configured to be decoded from the image by one or more of the second device or the server.

19. The computer readable storage device of claim 15, wherein if less than a whole of the active communication session is transferred to the first device, the operations further comprise running the at least part of the active communication session concurrently and synchronously with a remaining active communication session on the second device.

20. The computer readable storage device of claim 18, wherein the operations further include generating an authentication certificate corresponding to a user of the second device and sending the authentication certificate to the first device, prior to the transferring.

21. The computer readable storage device of claim 15, wherein the operations further comprise transferring the at least part of the active communication session, including transferring a video portion of the active communication session responsive to less than an entire active communication session being transferred from the second device.

* * * * *